United States Patent [19]

Ottlinger et al.

[11] Patent Number: 4,792,596
[45] Date of Patent: Dec. 20, 1988

[54] CONTINUOUS PROCESS FOR PREPARING ORGANOPOLYSILOXANES CONTAINING TRIORGANOSILOXY TERMINAL UNITS

[75] Inventors: Ralph Ottlinger, Murnau; Willi Streckel, Mehring-Od, both of Fed. Rep. of Germany

[73] Assignee: Wacker-Chemie GmbH, Munich, Fed. Rep. of Germany

[21] Appl. No.: 84,224

[22] Filed: Aug. 12, 1987

[30] Foreign Application Priority Data

Sep. 26, 1986 [DE] Fed. Rep. of Germany ....... 3632875

[51] Int. Cl.$^4$ .............................................. C08G 77/06
[52] U.S. Cl. ........................................ 528/14; 528/16; 528/23; 528/33; 528/37; 556/453; 556/456; 556/462; 556/467
[58] Field of Search ..................... 528/16, 14, 23, 33, 528/37; 556/462, 467, 453, 456

[56] References Cited

U.S. PATENT DOCUMENTS

| | | | |
|---|---|---|---|
| 3,236,806 | 2/1966 | Dunham, Jr. | 528/16 |
| 3,607,899 | 9/1971 | Brown et al. | 528/16 |
| 3,816,493 | 6/1974 | Nitzsche et al. | 528/12 |
| 4,599,437 | 7/1986 | Riederer | 556/462 |

*Primary Examiner*—Melvyn I. Marquis

[57] ABSTRACT

Organopolysiloxanes containing triorganosiloxy terminal units are obtained by a continuous process in which an organopolysiloxane mixture containing organo(poly)siloxanes having triorganosiloxy terminal units and cyclic organopolysiloxanes are introduced into a tube reactor that has been heated to at least 80° C. and which contains a static catalyst bed. The organopolysiloxane composition containing triorganosiloxy terminal units, which exits from the tube reactor is different from the organo(poly)siloxanes containing triorganosiloxy terminal units which were introduced into the reactor. The contents of the reactor in the area between one-third and two-thirds of the distance between the point where the organopolysiloxanes are introduced into the tube reactor and the point where the organopolysiloxanes exit from the reactor, are maintained at a temperature which is at least 50° C. below that which is immediately upstream from the outlet of the reactor.

1 Claim, No Drawings

CONTINUOUS PROCESS FOR PREPARING ORGANOPOLYSILOXANES CONTAINING TRIORGANOSILOXY TERMINAL UNITS

The present invention relates to a process for preparing organopolysiloxanes and more particularly to a continuous process for preparing organopolysiloxanes containing triorganosiloxy terminal units.

BACKGROUND OF THE INVENTION

A continuous process for preparing organopolysiloxanes containing triorganosiloxy terminal units is described in U.S. Pat. No. 3,816,493 to Nitzsche et al, in which cyclic organopolysiloxanes and organo(poly)siloxanes containing triorganosiloxy groups are introduced into a tube reactor containing a static catalyst bed that has been heated to at least 80° C. The organopolysiloxanes which exit from the reactor having terminal triorganosiloxy groups are different from the organo(poly)siloxanes having triorganosiloxy groups which were introduced into the reactor.

It is an object of the present invention to provide a continuous process for preparing organopolysiloxanes. Another object of the present invention is to provide a continuous process for preparing organopolysiloxanes having triorganosiloxy terminal units. A further object of the present invention is to provide a continuous process for preparing organopolysiloxanes having triorganosiloxy terminal units in a relatively inexpensive apparatus.

SUMMARY OF THE INVENTION

The foregoing objects and others which are apparent from the following description, are accomplished in accordance with this invention, generally speaking, by providing a continuous process for preparing organopolysiloxanes having triorganosiloxy terminal units, which comprises introducing into a tube reactor heated to at least 80° C. and containing a static catalyst bed, cyclic organopolysiloxanes and organo(poly)siloxanes having triorganosiloxy terminal units, in which the contents of the reactor in the area between one-third to two-thirds of the distance between the point where the organo(poly)siloxanes enter the reactor and the point where the organopolysiloxanes leave the reactor are maintained at a temperature which is at least 50° C. below that immediately prior to the point where the organopolysiloxanes leave the reactor and thereafter recovering organopolysiloxanes having triorganosiloxy terminal units, which are different from the organo(poly)siloxanes which are introduced into the reactor.

DESCRIPTION OF THE INVENTION

In the method of this invention it is possible to use as cyclic organopolysiloxanes any cyclic organopolysiloxanes which have been or could have been used heretofore in known methods for preparing organopolysiloxanes containing triorganosiloxy groups, from cyclic organopllysiloxanes and organo(poly)siloxanes containing triorganosiloxy groups. In the method of this invention, it is preferred that the cyclic organopolysiloxanes have the following formula:

$$(R_2SiO)_x,$$

where R reprssents the same, or different, monovalent hydrocarbon radicals or halogenated monovalent hydrocarbon radicals or hydrogen, with the proviso that no more than one hydrogen atom may be bonded to each silicon atom, and x is an integer having a value of from 3 to 15.

It is preferred that the halogenated hydrocarbon radicals represented by R contain no more than 20 carbon atoms per radical.

Examples of hydrocarbon radicals represented by R are alkyl radicals, such as the methyl and the ethyl radical, as well as the butyl, decyl and octadecyl radicals; cycloalkyl radicals, such as the cyclohexyl radical and methylcyclohexyl radicals; hydrocarbon radicals having at least one aliphatic multiple bond, such as the vinyl radical; aryl radicals, such as the phenyl radical; alkaryl radicals such as the tolyl radicals; and aralkyl radicals such as the benzyl radical. Examples of halogenated hydrocarbon radicals represented by R are halogenalkyl radicals, such as the 3,3,3-trifluoropropyl radical and halogenaryl rddicals such as o-, p- and m-chlorophenyl radicals. Because of their availability, it is preferred that at least 70 percent of the number of organic radicals of the cyclic organopolysiloxanes used in the method of this invention be methyl radicals.

In the method of this invention, only one type of cyclic organopolysiloxane may be used or a mixture containing two or more different types of cyclic organopolysiloxanes may be used, in which the differences between the different cyclic organopolysiloxanes is the number of silicon atoms in the ring, and/or different substituents on the silicon atoms.

It is possible to use in the method of this invention organo(poly)siloxanes having triorganosiloxy uiits which have been or could have been used heretofore in known processes for preparing organopolysiloxanes having triorganosiloxy terminal groups from cyclic organopolysiloxanes and organ(poly)siloxanes containing triorganosiloxy groups. It is preferred in the method of this invention, that organopolysiloxanes having triorganosiloxy groups of the following formula be used:

$$R_3^1SiO(SiR_2O)_ySiR_3^1$$

in which R is the same as above, $R^1$ is the same or different, monovalent hydrocarbon radicals or halogenated monovalent hydrocarbon radicals, and y is 0 or an integer having a value of from 1 to 500.

All examples cited for hydrocarbon radicals represented by R in the cyclic organopolysiloxanes are equally applicable for the R and $R^1$ radicals of the organo(poly)siloxanes.

It is possible in the method of this invention to use only one type of organo(poly)siloxane having triorganosiloxy groups, or a mixture of two or more different types of such organo(poly)siloxanes may be used, in which the differences between the organo(poly)siloxanes may be in the length of the chain and/or the substituents on the silicon atoms.

The amount of the organo(poly)siloxanes having triorganosiloxy groups used in the process of this invention, depends on the desired chain length of the organopolysiloxanes recvered from the tube reactor. The greater the amount used, the lower the viscosity of the organopolysiloxanes leaving the tube reactor. Therefore, it is preferred that the amount of organo(poly)siloxane be at least large enough to ensure that the organopolysiloxanes produced by the method of this invention have an average viscosity of no more than about 50,000 $mm^2.s^{-1}$ at 23° C.

In some methods, for example, during the hydrolysis of dimethyldichlorosilane or during the reaction of dimethyldichlorosilane with methanol, in accordance with the procedure described in U.S. Pat. No. 4,032,557 to Spörk et al, mixtures of cyclic organopolysiloxanes and linear organo(poly)siloxanes having an Si-bonded hydroxyl group in each of its terminal units are obtained. Therefore, it is preferred, in the method of this invention, that not only cyclic organopolysiloxanes and organo(poly)siloxanes containing triorganosiloxy groups be introduced into the tube reactor, but also diorganosilanediols or linear organo(poly)siloxanes having an Si-bonded hydroxyl group in each of its terminal units be introduced into the reactor. Moreover, it is preferred that the diorganosilanediols and the organo(poly)siloxanes containing an Si-bonded hydroxyl group in each of its terminal units have the following formula:

HO(SiR$_2$O)$_n$H, in which R is the same as above and n represents an integer having a value of from 1 to 1,000.

The examples of hydrocarbon radicals represented by R for the cyclic organopolysiloxanes are equally applicable for the R radicals of the organo(poly)siloxanediols or diorganosilanediols. The diphenylsilanediol is an example of a diorganosilanediol having the above formula.

Only one type of diorganosilanediol or organo(poly)siloxane having an Si-bonded hydroxyl group in each of its terminal units need be used in hhe process of this invention; however, a mixture of two or more different types of such organosilicon compounds may be used.

If a diorganosilanediol and/or an organopolysiloxane having an Si-bonded hydroxyl group in each of its terminal units are also employed in the method of this invention, then it is preferred that they be present in an amount such that no more than 10 Si-bonded hydroxyl groups are present for each 100 Si atoms present in all of the organosilicon compounds which are introduced into the reactor.

It is preferred that the tube reactor used in the method of this invention have a ratio of length to diameter of from 1.5:1 to 20:1, and more preferably from about 5:1 to 10:1.

The tube reactor may be positioned horizontally or vertically or at an angle other than 90° from the horizontal; however, a vertical reactor is the preferred position. When the reactor is in a horizontal position or at an angle other than 90° relative to horizontal, then the organosilicon compounds which are to be reacted with each other, can be introduced into the reactor either from the top or from the bottom. It is preferred, however, that the organosilicon compounds be introduced into the bottom of the reactor.

Any of the catalysts which have been or could have been employed heretofore in known methods for preparing organopolysiloxanes having triorganosiloxy terminal groups in a tube reactor may be employed in the static catalytic bed of this invention. Examples of such catalysts are, for example, acid-activated montmorillonite, such as the commercially available acid-activated montmorillonite having the following properties:

| | |
|---|---|
| Bulk density: | 520 ± 20 g/liter |
| Vibrated density: | 590 ± 60 g/liter |
| Humidity loss (2 hours, 110° C.): | maximum: 10 percent by weight |
| Ignition loss (1000° C.): | approx. 5.5 percent by weight |
| pH in 10 percent by weight aqueous suspension: | approx. 3 |
| Sieve analysis: | |
| Less than 0.25 mm | maximum: 10 percent by weight |
| 0.25 to 0.55 mm | 80 to 90 percent by weight |
| Over 0.55 mm | maximum: 10 percent by weight |

The montmorillonite has the following chemical composition: silicon dioxide, aluminum oxide, ferric(III)-oxide, magnesium oxide, calcium oxide, sodium oxide, potassium oxide.

Additional examples of catalysts which may be employed as the stationary catalyst bed in the tube reactor, used in the process of this invention are, for example, aluminum silicates having a molecular sieve structure, sulfonated carbon, acid-activated carbon black, cation-exchange polymers having sulfonyl groups containing side chain as the ion-exchange elements, where the sulfonyl groups are always bonded to at least one carbon atom that carries a fluorine atom, as well as other cation-exchange polymers, especially cation-exchange macro-crosslinked polymers, such as a granular macro-crosslinked polymer having sulfonyl groups as the ion-exchange elements, and having the following properties:

| | |
|---|---|
| Surface area: | 45 m$^2$/g |
| Porosity: | 32 percent by volume |
| Ion-exchange capacity: | 4.6 milliequivalents/g |
| | 1.8 milliequivalents/ml |

It is preferred that the static catalyst bed extend throughout the length of the tube reactor.

It is preferred that the contents of the reactor in the area between one-third and two-thirds of the distance between the point were the organo(poly)siloxanes are introduced into the reactor, and the point where the organopolysiloxanes produced therein leave the reactor, be in a temperature range of from about 80° to about 160° C., and that the temperature of the remainder of the distance between the point where the organo(poly)siloxanes enter the reactor and the point where the organopolysiloxanes produced in the reactor leave the reactor be in the range of from 160° to about 250° C. and more preferably from about 160° to about 200° C. This is, of course, subject to the proviso that the temperature of the contents of the reactor in the area between one-third and two-thirds of the distance between the point where the organo(poly)siloxanes enter the reactor and the point where the organopolysiloxanes produced leave the reactor, is at least 50° C. below that just prior to the point where the contents exit from the reactor.

The organopolysiloxanes entering the reactor may be at room temperature or they may be heated to a temperature up to about 160° C.

It is preferred that the process of this invention be carried out at atmospheric pressure, i.e., at 1,020 hPa (absolute) or approximately 1,020 hPa (absolute), or at the hydrostatic pressure of the liquid column in the reactor. However, if desired, higher or lower pressures may be used as well, for example, pressures in the range of from 50 to about 500 hPa (absolute).

The average contact time for organosilicon compounds in the tube reactor is preferably between 4 and 20 minutes.

Any organosilicon compounds whose boiling point is lower than that of the desired organopolysiloxane can be removed by distillation from the organopolysiloxanes exiting from the reactor and then be recycled back into the tube reactor.

In the following examples, all parts are by weight unless otherwise specified. All of the viscosities were determined at 23° C.

EXAMPLE 1

A mixture consisting of 22 parts of cyclic dimethylpolysiloxanes having from 3 to 10 silicon atoms per molecule and a viscosity of 4.2 mm$^2$.s$^{-1}$, 3 parts of a dimethylpolysiloxane having an Si-bonded hydroxyl group in each of its terminal units and having a viscosity of 120 mm$^2$.s$^{-1}$ and 1 part of hexamethyldisiloxane was introduced at the bottom of a vertical tube reactor filled with an acid-activated montmorillonite at the rate of 400 ml per hour, so that the average contact time of the organosilicon compounds in the tube reactor was 9.75 minutes. The acid-activated montmorrillonite had the following physical properties:

| | |
|---|---|
| Bulk density: | 520 ± 20 g/liter |
| Vibrated density: | 590 ± 60 g/liter |
| Humidity loss (2 hours, 110° C.): | maximum: 10 percent by weight |
| Ignition loss (1000° C.): | approx. 5.5 percent by weight |
| pH in 10 percent by weight aqueous suspension: | approx. 3 |
| Sieve analysis: | |
| Less than 0.25 mm | maximum: 10 percent by weight |
| 0.25 to 0.55 mm | 80 to 90 percent by weight |
| Over 0.55 mm | maximum: 10 percent by weight |

The tube reactor was 18 cm long with an inside diameter of 2.5 cm, in which the lower half of the reactor was surrounded by a heating jacket that was heated to 130° C., while the upper half of the reactor was heated to 18° C. by another heating jacket.

The constituents which boil at temperatures below 210° C. at 0.5 hPa (absolute), were distilled off at the top end of the tube reactor within which the dimethylpolysiloxanes containing trimethylsiloxy terminal units were produced. After the low-boiling constituents have been distilled off, the resultant dimethylpolysiloxanes having trimethylsiloxy terminal units, had a viscosity of 112 mm$^2$.s$^{-1}$1, a residual volatility (2 hours, 200° C.) of 1.78 percent by weight and contained less than 90 ppm by weight of Si-bonded hydroxyl groups. The organopolysiloxane yield was 88.2 percent by weight of theory.

EXAMPLE 2

The method of Example 1 was repeated, except that a granular macro-crosslinked polymer having sulfonyl groups as the ion-exchange elements and having the following physical properties:

| | |
|---|---|
| Surface area: | 45 m$^2$/g |
| Porosity: | 32 percent by volume |
| Ion-exchange capacity: | 4.6 milliequivalents/g |
| | 1.8 milliequivalents/ml | was substituted for the acid-activated montmorillonite of Example 1. The same results were obtained as in Example 1.

COMPARISON EXAMPLE

The method described in Example 1 was repeated, except that the tube reactor was heated with only one heating jacket which covered the entire reactor, instead of two separate heating jackets. The tube reactor was operated at a temperature of 155° C., which is the average temperature of the two heating jackets used in Example 1.

After distilling off the lower-boiling constituents, the dimethylpolysiloxanes containing trimethylsiloxy terminal units, had a viscosity of 95 mm$^2$.s$^{-1}$, a residual volatility (2 hours, 200° C.) of 1.1 percent by weight and an Si-bonded hydroxyl group content of 510 ppm by weight. The organopolysiloxane yield was 87.3 percent by weight of theory.

What is claimed is:

1. A continuous method for preparing organopolysiloxanes having trioganosiloxy terminal units, which comprises introducing an organopolysiloxane mixture containing cyclic organopolysiloxanes and organo(poly)siloxanes having triorganosiloxy terminal groups into a tube reactor that has been heated to 80° C. and which contains a static catalyst bed, in which the catalyst is selected from the group consisting of acid activated montmorillonite, aluminum silicates having a molecular sieve structure, sulfonated carbon, acid activated carbon black and cation-exchange polymers having sulfonyl groups as the ion exchange elements, and thereafter recovering an organopolysiloxane whose composition is different from that of the organo(poly)siloxane having triorganosiloxy terminal groups which has been introduced into the reactor; in which the temperature of the contents of the reactor in the area between one-third and two-thirds of the distance between the point where the organopolysiloxane mixture enters the reactor and the point where the resultant organopolysiloxane composition leaves the reactor, is at least 50° C. below the temperature which is immediately prior to the point where the resultant organopolysiloxane composition leaves the reactor.

* * * * *

UNITED STATES PATENT AND TRADEMARK OFFICE
CERTIFICATE OF CORRECTION

PATENT NO. : 4,792,596
DATED : December 20, 1988
INVENTOR(S) : Dr. Ralph Ottlinger and Willi Streckel It is certified that error appears in the above-identified patent and that said Letters Patent is hereby corrected as shown below:

Column 6, line 38, after "heated to", insert

--- at least ---.

Signed and Sealed this

Fifteenth Day of August, 1989

Attest:

DONALD J. QUIGG

*Attesting Officer*    *Commissioner of Patents and Trademarks*